United States Patent
Zhao et al.

(10) Patent No.: US 11,325,804 B2
(45) Date of Patent: May 10, 2022

(54) TAPE ATTACHING METHOD

(71) Applicant: DISCO CORPORATION, Tokyo (JP)

(72) Inventors: Jinyan Zhao, Tokyo (JP); Shigenori Harada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 231 days.

(21) Appl. No.: 16/899,048

(22) Filed: Jun. 11, 2020

(65) Prior Publication Data
US 2020/0399090 A1 Dec. 24, 2020

(30) Foreign Application Priority Data

Jun. 18, 2019 (JP) .............................. JP2019-112538

(51) Int. Cl.
| | |
|---|---|
| *B29C 63/02* | (2006.01) |
| *B65H 37/04* | (2006.01) |
| *B65H 37/00* | (2006.01) |
| *B29L 31/34* | (2006.01) |

(52) U.S. Cl.
CPC ............. *B65H 37/04* (2013.01); *B29C 63/02* (2013.01); *B65H 37/002* (2013.01); *B29L 2031/3406* (2013.01); *B65H 2701/194* (2013.01)

(58) Field of Classification Search
None
See application file for complete search history.

(56) References Cited

U.S. PATENT DOCUMENTS

2004/0266094 A1 * 12/2004 Nagai ............... H01L 21/67092
438/232

FOREIGN PATENT DOCUMENTS

JP 06177243 A 6/1994

* cited by examiner

*Primary Examiner* — Jeffry H Aftergut
(74) *Attorney, Agent, or Firm* — Greer Burns & Crain Ltd.

(57) ABSTRACT

A tape attaching method for attaching a tape to a workpiece includes a placing step of placing the workpiece with respect to the tape, which has a base material and an adhesive layer on the base material, in such a manner that the adhesive layer is in contact with an attached face of the workpiece, and a close contact step of causing, after the placing step is performed, a ball to roll in contact with the base material of the tape, thereby to bring the tape in close contact with the workpiece.

3 Claims, 5 Drawing Sheets

TAPE ATTACHING METHOD

BACKGROUND OF THE INVENTION

Field of the Invention

The present invention relates to a tape attaching method for attaching a tape to a workpiece.

Description of the Related Art

In a manufacturing process of device chips, a wafer which is partitioned by projected division lines (streets) into a plurality of regions where respective devices are formed is used. The wafer is divided along the projected division lines, thereby obtaining a plurality of device chips. Various processes by use of processing apparatuses are performed on the wafer. Examples of the processes include a grinding process of grinding the wafer with a grinding apparatus to thin the wafer and a cutting process of cutting and dividing the wafer with a cutting apparatus. Further, in a case in which the wafer is to be processed by use of the processing apparatuses, a tape is attached to the wafer for the purpose of enhancing handleability of the wafer, protecting the devices formed on the wafer, or the like.

In recent years, there has been widely used a technique of automatically attaching a tape to a wafer. For example, Japanese Patent Laid-open No. Hei 06-177243 discloses a tape attaching apparatus including a holding table for holding a wafer and a movable roller for attaching a tape to the wafer. The tape attaching apparatus causes, in a state in which the tape is placed on the wafer held by the holding table, the movable roller to roll from one end side to another end side of the wafer so as to press the tape against the wafer by use of the movable roller. The tape is thus automatically attached to the wafer.

SUMMARY OF THE INVENTION

Some wafers have minute and elaborate devices such as devices (MEMS devices) configured by use of the MEMS (Micro Electro Mechanical Systems) technology formed thereon. If the tape attaching apparatus as described above is used to attach a tape to a wafer having such devices formed thereon, there is the possibility that the devices are damaged due to strong pressure by the movable roller. Therefore, depending on the configuration, the property, and the like of the devices formed on the wafer, it is desirable to attach the tape to the wafer by a method that reduces the load on the wafer as much as possible. To this end, a technique of attaching a tape to a wafer by placing the wafer on the tape supported to be flat is used in some cases. Since this technique prevents the wafer from being pressed excessively, devices formed on the wafer are hardly damaged.

With the technique of placing the wafer on the tape, however, gases are sometimes entrapped between the wafer and the tape to be left as bubbles. The residual bubbles impede the wafer and the tape from being appropriately brought into close contact with each other, which leads to occurrence of processing defects at the time of processing the wafer. For example, in some cases, the wafer is held in a non-flat manner due to the bubbles, and it is difficult to grind the entire wafer uniformly at the time of grinding the wafer. Besides, at the time of cutting and dividing the wafer into a plurality of device chips, the bubbles may hinder adhesion between the device chips and the tape, resulting in scattering of the device chips.

The present invention has been made in view of the above circumstances, and it is an object of the present invention to provide a tape attaching method which can suppress bubbles from being left between a tape and a workpiece exemplified by a wafer having devices formed thereon.

In accordance with an aspect of the present invention, there is provided a tape attaching method for attaching a tape to a workpiece. The tape attaching method includes a placing step of placing the workpiece with respect to the tape, which has a base material and an adhesive layer on the base material, in such a manner that the adhesive layer is in contact with an attached face of the workpiece, and a close contact step of causing, after the placing step is performed, a ball to roll in contact with the base material of the tape, thereby to bring the tape in close contact with the workpiece.

It is to be noted that, preferably, in the close contact step, the ball is caused to roll spirally from a central portion to an outer peripheral edge side of the workpiece. Further, preferably, the tape has an outer peripheral portion attached to an annular frame and, in the close contact step, the ball is caused to roll in a state in which the annular frame is supported and the workpiece is not supported by any member other than the tape.

In the tape attaching method according to the aspect of the present invention, the workpiece is placed in contact with the tape, and the ball is then caused to roll in contact with the base material of the tape, thereby to bring the tape into close contact with the workpiece. Accordingly, the tape can be attached to the workpiece while the ball is rolled to allow bubbles formed between the workpiece and the tape to escape. This can suppress bubbles from being left between the workpiece and the tape after the tape is attached.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
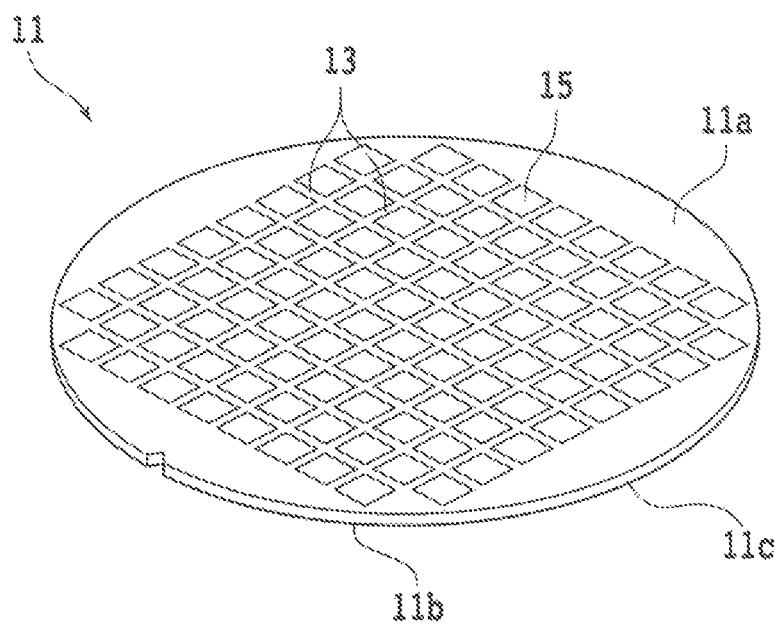
FIG. 1 is a perspective view of a workpiece.

A preferred embodiment of the present invention will be described in detail below with reference to the attached drawings. First, a configuration example of a workpiece to which a tape is to be attached by a tape attaching method according to the present embodiment is described. FIG. 1 is a perspective view of a workpiece 11. The workpiece 11 is a member which is to be processed, cleaned, and the like with a tape attached (e.g., an object to be processed and an object to be cleaned).

The workpiece 11 is, for example, a silicon wafer formed in a disc-like shape and has a front face 11a, a back face 11b, and an outer peripheral edge 11c. The workpiece 11 is partitioned into a plurality of regions by a plurality of crossing projected division lines (streets) 13 arrayed in a grid pattern, and devices 15 including MEMS devices are formed in the respective regions on the front face 11a side. In other words, the workpiece 11 is a MEMS wafer including a plurality of MEMS devices. It is to be noted that the material, the shape, the structure, the size, and the like of the workpiece 11 are not limited. For example, the workpiece 11 may include a material such as a semiconductor other than silicon (gallium arsenide (GaAs), indium phosphide (InP), gallium nitride (GaN), silicon carbide (SiC), or the like), glass, ceramic, resin, or metal. The type, the quantity, the shape, the structure, the size, the layout, and the like of the devices 15 are not limited, either. For example, the devices 15 may be ICs (Integrated Circuits), LSIs (Large Scale Integrations), or the like. Alternatively, the workpiece 11 may not have devices 15 formed thereon.

The workpiece 11 is divided along the projected division lines 13, thereby to obtain a plurality of device chips having the respective devices 15. It is to be noted that, for the division of the workpiece 11, a cutting apparatus which cuts the workpiece 11 by use of an annular cutting blade, a laser processing apparatus which processes the workpiece 11 by irradiation of a laser beam, and the like are used. Further, in order to reduce the thickness of the device chips, the workpiece 11 to be divided is thinned in some cases. For the thinning of the workpiece 11, a grinding apparatus which grinds the workpiece 11 by use of grinding stones, a polishing apparatus which polishes the workpiece 11 by use of a polishing pad, and the like are used. Before processing the workpiece 11 by use of the various processing apparatuses described above, a tape is attached to the workpiece 11 for the purpose of enhancing handleability of the workpiece 11, protecting the devices 15 formed on the workpiece 11, and the like. For example, the workpiece 11 may be supported to an annular frame trough the tape, so that the workpiece 11 can be easily transported and held.

Figure 2A:
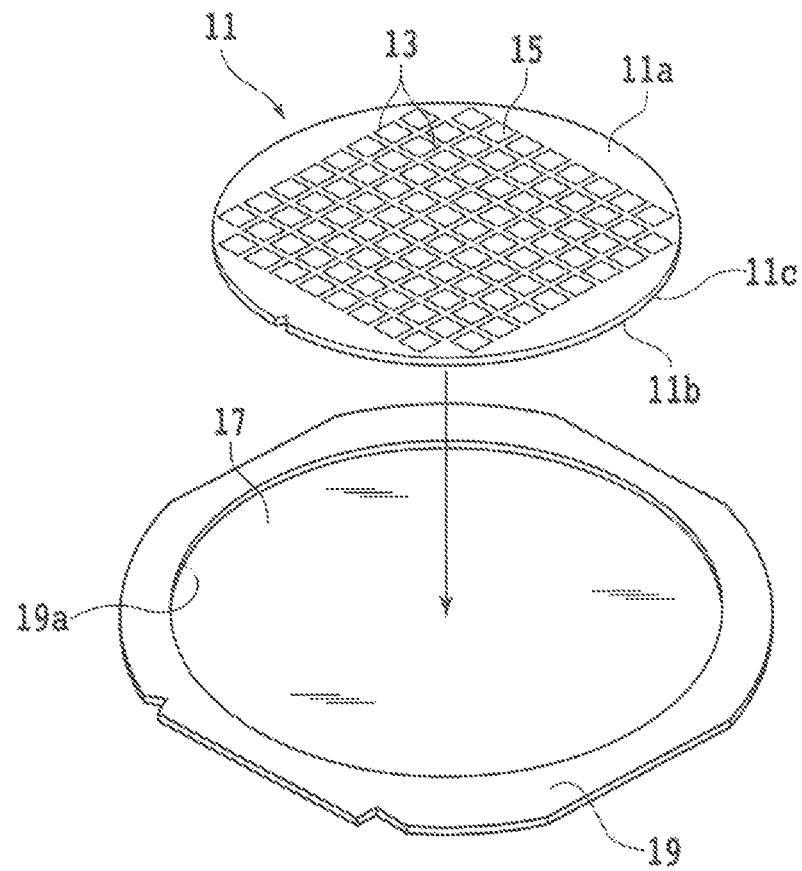
FIG. 2A is a perspective view of the workpiece in a placing step.

In the tape attaching method according to the present embodiment, the workpiece 11 is first placed so as to be in contact with a tape (placing step). FIG. 2A is a perspective view of the workpiece 11 in the placing step. It is to be noted that a case in which the back face 11b of the workpiece 11 serves as a face to be attached to a tape 17 (attached face) is described as an example. Alternatively, the attached face may be the front face 11a of the workpiece 11.

In the placing step, the workpiece 11 and the tape 17 to be attached to the workpiece 11 are prepared first. For example, the tape 17 includes a polymer film through which gases can pass and is formed in a circular shape having a diameter larger than a diameter of the workpiece 11. The tape 17 corresponds, for example, to a dicing tape which is used when the workpiece 11 is cut by use of the cutting blade mounted on the cutting apparatus.

Figure 2B:
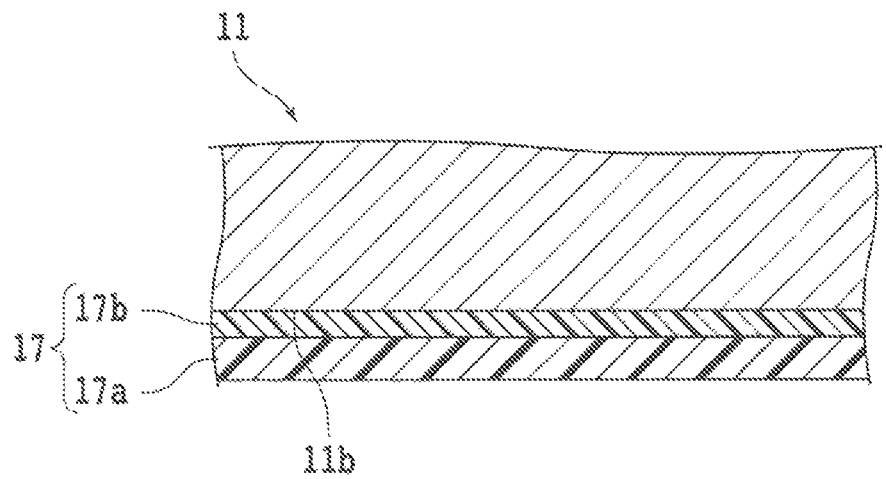
FIG. 2B is a partially enlarged cross-sectional view of the workpiece after the placing step is performed.

The tape 17 includes a base material 17a in a circular film shape and an adhesive layer (paste layer) 17b formed on the base material 17a (refer to FIG. 2B). The base material 17a includes, for example, a resin such as polyolefin, polyvinyl chloride, or polyethylene terephthalate. The adhesive layer 17b includes, for example, an ultraviolet curable resin which is cured when irradiated with ultraviolet rays. It is to be noted that the base material 17a and the adhesive layer 17b each include a material through which air can pass. The tape 17 has an outer peripheral portion attached to an annular frame 19 which has at a central portion thereof a circular opening 19a having a diameter larger than the diameter of the workpiece 11. The tape 17 is thus exposed on the adhesive layer 17b side within the opening 19a.

Then, the workpiece 11 is placed on the tape 17 such that the back face 11b (attached face) of the workpiece 11 and the adhesive layer 17b of the tape 17 are in contact with each other. The workpiece 11 is thereby supported by the annular frame 19 through the tape 17 within the opening 19a. FIG. 2B is a partially enlarged cross-sectional view of the workpiece 11 after the placing step is performed. It is to be noted that, in a stage in which the workpiece 11 is placed on the tape 17, the tape 17 is not completely attached to the workpiece 11. In other words, the workpiece 11 is merely placed on the tape 17 and not adhered to the tape 17 or partially adhered to the tape 17, which means that the workpiece 11 and the tape 17 are not in close contact with each other.

When the workpiece 11 is placed on the tape 17, gases enter between the workpiece 11 and the tape 17 to form bubbles in some cases. In a case in which the workpiece 11 is placed in the atmosphere, for example, air may enter between the workpiece 11 and the tape 17, and bubbles containing air may be left between the workpiece 11 and the tape 17 after the workpiece 11 is placed. The residual bubbles impede the workpiece 11 and the tape 17 from being appropriately brought into close contact with each other, which leads to occurrence of processing defects at the time of processing the workpiece 11. For example, the workpiece 11 may be held in a non-flat manner due to the bubbles, and it is difficult to grind the entire workpiece 11 uniformly at the time of grinding the workpiece 11 in some cases. Besides, at the time of cutting and dividing the workpiece 11 into a plurality of device chips, the bubbles may hinder adhesion between the device chips and the tape 17, resulting in scattering of the device chips. Therefore, it is desirable to suppress bubbles from being left between the workpiece 11 and the tape 17 as much as possible.

To this end, in the present embodiment, a ball is caused to roll in contact with the base material 17a of the tape 17 after the placing step is performed, thereby bringing the tape 17 into close contact with the workpiece 11 (close contact step). This enables to securely attach the tape 17 to the workpiece 11 while suppressing bubbles from being left between the workpiece 11 and the tape 17.

Figure 3:
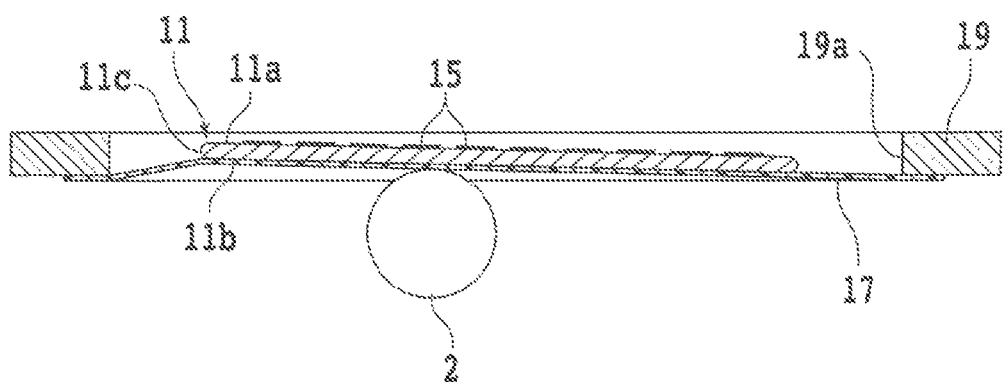
FIG. 3 is a cross-sectional view illustrating a manner in which a ball rolls on a lower side of a tape.

FIG. 3 is a cross-sectional view illustrating a manner in which a ball 2 rolls on a lower side of the tape 17. In the close contact step, the annular frame 19 is first supported such that the workpiece 11 is set horizontally. FIG. 3 illustrates a state in which the annular frame 19 is supported such that the workpiece 11 is placed on an upper side of the tape 17. It is to be noted that the method of supporting the annular frame 19 is not limited. For example, the annular frame 19 may be placed on an annular support member (refer to FIG. 4), or a plurality of clamps for holding and fixing the annular frame 19 may be used.

Next, the ball 2 is placed on the lower side of the tape 17. The ball 2 is a spherical member including an elastic body made of a rubber, a resin, or the like. For example, a rubber ball or a resin ball may be used as the ball 2. The ball 2 is then moved to the tape 17 side and brought into contact with the base material 17a (refer to FIG. 2B) of the tape 17. When the ball 2 is brought into contact with the tape 17, the tape 17 is slightly pressed against the workpiece 11. FIG. 3 illustrates a state in which the tape 17 is stretched and the workpiece 11 is pressed upward because of the pressure by the ball 2. The tape 17 is thereby brought into close contact with the workpiece 11 in a region where the tape 17 is in contact with the ball 2. It is to be noted that a movement amount (rising amount) of the ball 2 is appropriately adjusted within a range within which the workpiece 11 is not peeled off from the tape 17 because of the upward pressure to the tape 17 by the ball 2. Further, at the time when the ball 2 is pressed against the tape 17, the workpiece 11 is not supported on the front face 11a side, so that the workpiece 11 is movable in a vertical direction (up-down direction). Therefore, an excessive pressure is not applied to the workpiece 11 even when the ball 2 is pressed against the tape 17. This prevents the workpiece 11 (e.g., the devices 15) from being damaged.

After the placing step described above is performed, bubbles are sometimes left between the workpiece 11 and the tape 17. In this case, when the ball 2 is brought into contact with the tape 17 to press the tape 17 upward, bubbles are sandwiched between the workpiece 11 and the region of the tape 17 where the tape 17 is in contact with the ball 2 and pushed out toward a region where the ball 2 and the tape 17 are not in contact with each other. Alternatively, bubbles are pushed into the tape 17 and discharged externally through the tape 17. Accordingly, bubbles are removed from the close-contact region between the workpiece 11 and the tape 17.

Next, the ball 2 is caused to roll in contact with the base material 17a of the tape 17. The tape 17 is thereby pressed upward to the workpiece 11 side in a region where the ball 2 rolls, and the tape 17 in the region is brought into close contact with the workpiece 11. After the ball 2 is caused to roll over the entire region of the tape 17 overlapping the workpiece 11, the tape 17 is brought into close contact with the entire attached face (back face 11b) of the workpiece 11, so that the tape 17 is attached to the workpiece 11.

In the close contact step described above, the tape 17 can be attached to the workpiece 11 while rolling the ball 2 to allow the bubbles formed between the workpiece 11 and the tape 17 to escape. This can suppress bubbles from being left between the workpiece 11 and the tape 17 after the tape 17 is attached.

Figure 4:
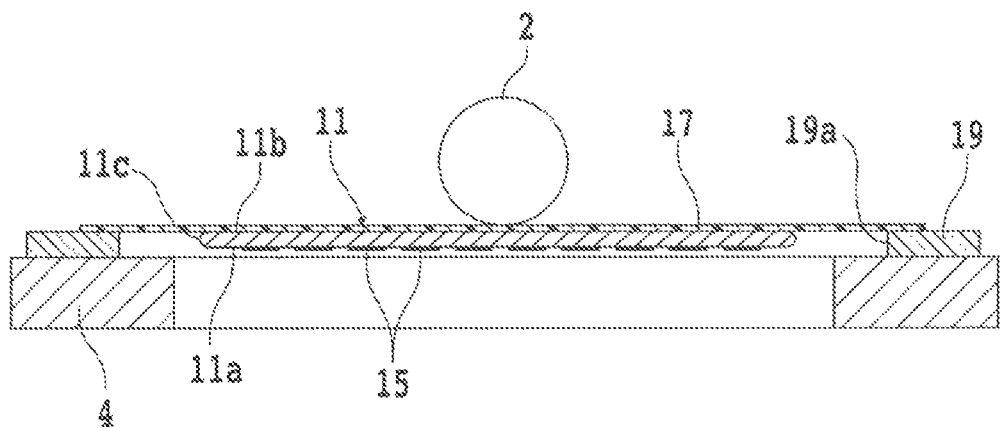
FIG. 4 is a cross-sectional view illustrating a manner in which the ball rolls on an upper side of the tape.

It is to be noted that the ball 2 can be rolled also in a state in which the workpiece 11 is placed on the lower side of the tape 17. FIG. 4 is a cross-sectional view illustrating a manner in which the ball 2 rolls on the upper side of the tape 17. In FIG. 4, the annular frame 19 is supported such that the workpiece 11 is placed on the lower side of the tape 17. More specifically, an annular support member 4 for supporting the annular frame 19 is installed, and the annular frame 19 is disposed on the support member 4 such that a face of the annular frame 19 to which the tape 17 is not attached is in contact with an upper face of the support member 4. The annular frame 19 is thus supported by the support member 4. It is to be noted that, at this time, the workpiece 11 is not completely in close contact with the tape 17 but is partially adhered to the tape 17 to such an extent as to keep the workpiece 11 from falling off from the tape 17. In this state, the ball 2 is placed on the tape 17 and caused to roll. The ball 2 thus rolls in contact with the base material 17a (refer to FIG. 2B) of the tape 17, and the tape 17 is slightly pressed down to the workpiece 11 side. Accordingly, the attached face (back face 11b) of the workpiece 11 and the adhesive layer 17b of the tape 17 are brought into close contact with each other, so that the tape 17 is attached to the workpiece 11.

It is to be noted that FIG. 3 and FIG. 4 illustrate the example in which the ball 2 is caused to roll in the state in which the annular frame 19 is supported and the workpiece 11 is not supported by any member other than the tape 17. In a case in which it is necessary to press the tape 17 against the workpiece 11 strongly to some extent, the ball 2 may be rolled in a state in which the workpiece 11 is supported by another member and the movement of the workpiece 11 is restricted. For example, in FIG. 3, the ball 2 may be pressed against the tape 17 and rolled in a state in which the workpiece 11 is supported on the front face 11a side by a predetermined support member from above and the upward movement of the workpiece 11 is restricted. The tape 17 is thus pressed against the workpiece 11 strongly, and the workpiece 11 and the tape 17 are securely brought into close contact with each other. Similarly, in FIG. 4, the ball 2 may be rolled on the tape 17 in a state in which the workpiece 11 is supported on the front face 11a side by a predetermined support member from below and the downward movement of the workpiece 11 is restricted, thereby pressing the tape 17 against the workpiece 11. It is to be noted that the devices 15 are formed on the front face 11a side of the workpiece 11, and there is the possibility that the devices 15 are damaged if the tape 17 is pressed by the ball 2 in a state in which the workpiece 11 is supported by the predetermined support member in the region of the workpiece 11 where the devices 15 are formed. To avoid such damages, in the case in which the workpiece 11 is supported on the front face 11a side, only an outer peripheral region (outer peripheral surplus region) of the workpiece 11 where the devices 15 are not formed may be supported.

It is to be noted that, in the close contact step, it is preferable that a rubber ball or a resin ball including a flexible elastic body is used as the ball 2. In this case, the ball 2 is deformed when being in contact with the tape 17, so that a contact area between the ball 2 and the tape 17 is increased. Accordingly, the tape 17 can be brought into close contact with the workpiece 11 efficiently. Further, with the flexible and deformable ball 2, the tape 17 is hardly damaged when the ball 2 is brought into contact with the tape 17.

Figure 5A:
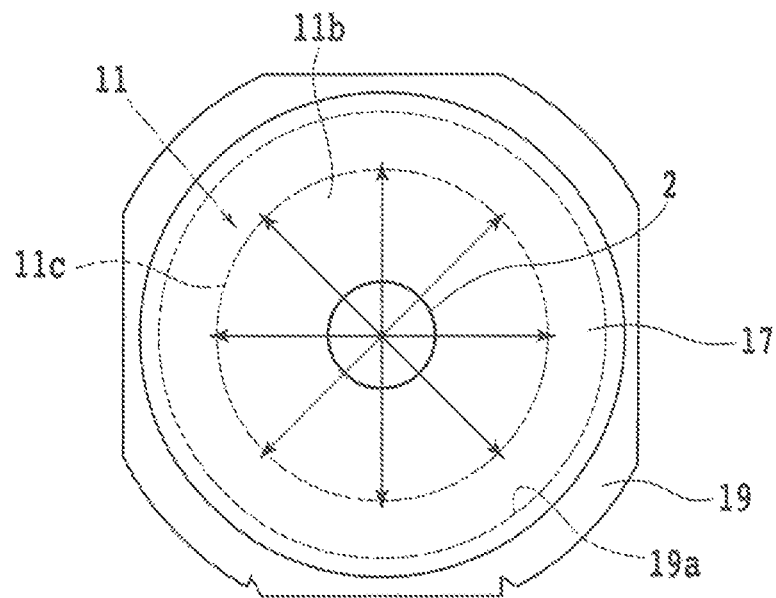
FIG. 5A is a bottom view illustrating a manner in which the ball rolls radially.
Figure 5B:
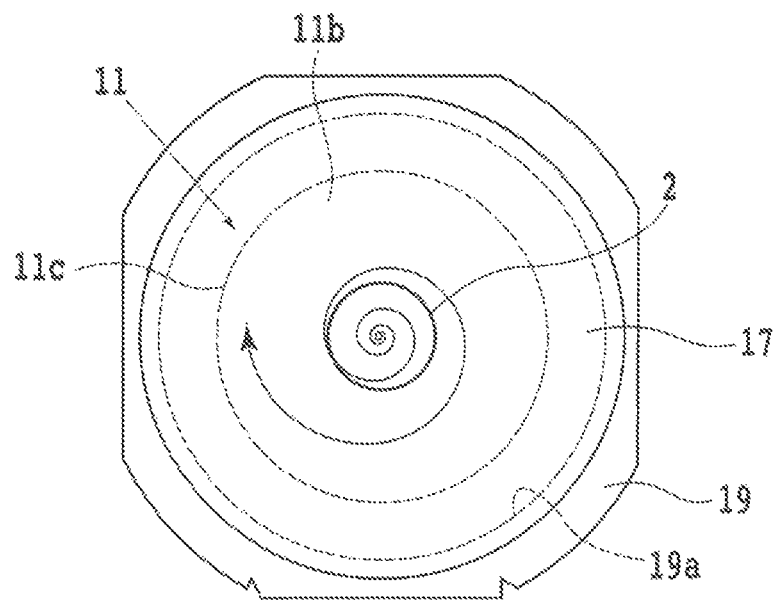
FIG. 5B is a bottom view illustrating a manner in which the ball rolls spirally.

In the close contact step, it is preferable that the ball 2 is caused to roll from a central portion to the outer peripheral edge 11c side of the workpiece 11. FIG. 5A is a bottom view illustrating a manner in which the ball 2 rolls radially from the central portion to the outer peripheral edge 11c side of the workpiece 11. In this case, an operation of causing the ball 2 to roll linearly from a center or the vicinity thereof to the outer peripheral edge 11c side of the workpiece 11 is repeated. FIG. 5B is a bottom view illustrating a manner in which the ball 2 rolls spirally from the central portion to the outer peripheral edge 11c side of the workpiece 11. In this case, the ball 2 is placed at the center of the workpiece 11 or the vicinity thereof and then caused to revolve around the center so as to gradually go away from the center. As described above, when the ball 2 is caused to roll from the central portion to the outer peripheral edge 11c side of the workpiece 11, the tape 17 is brought into close contact with the workpiece 11 sequentially from the central portion to the outer peripheral edge 11c side of the workpiece 11. Therefore, even when bubbles are left between the workpiece 11 and the tape 17 after the placing step is performed, the tape 17 can be attached to the workpiece 11 while allowing the bubbles to escape to the outer peripheral edge 11c side of the workpiece 11 in the close contact step. This efficiently suppresses the bubbles from being left between the workpiece 11 and the tape 17.

As described above, in the tape attaching method according to the present embodiment, the workpiece 11 is placed in contact with the tape 17, and the ball 2 made of an elastic body is then caused to roll in contact with the base material 17a of the tape 17, so that the tape 17 is brought into close contact with the workpiece 11. Accordingly, the tape 17 can be attached to the workpiece 11 while the ball 2 is rolled to allow the bubbles formed between the workpiece 11 and the tape 17 to escape. This can suppress bubbles from being left between the workpiece 11 and the tape 17 after the tape 17 is attached.

It is to be noted that, although the present embodiment describes the example in which the tape 17 having the diameter larger than the diameter of the workpiece 11 is attached to the workpiece 11, the shape and the type (function) of the tape 17 are not limited. For example, the tape 17 having a diameter substantially the same as the diameter of the workpiece 11 may be attached to the back face 11b side of the workpiece 11. In this case, the tape 17 is not attached to the annular frame 19. Alternatively, for example, the tape 17 may be a protective tape which is attached to the front face 11a of the workpiece 11 to cover and protect the plurality of devices 15.

Furthermore, the structure, the method, and the like according to the above embodiment may be appropriately modified without departing from the scope of the object of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A tape attaching method for attaching a tape to a workpiece, comprising:
    a placing step of placing the workpiece with respect to the tape, which has a base material and an adhesive layer on the base material, in such a manner that the adhesive layer is in contact with an attached face of the workpiece; and
    a close contact step of causing, after the placing step is performed, a ball to roll in contact with the base material of the tape, thereby to bring the tape in close contact with the workpiece.

2. The tape attaching method according to claim 1, wherein, in the close contact step, the ball is caused to roll spirally from a central portion to an outer peripheral edge side of the workpiece.

3. The tape attaching method according to claim 1, wherein the tape has an outer peripheral portion attached to an annular frame, and
    in the close contact step, the ball is caused to roll in a state in which the annular frame is supported and the workpiece is not supported by any member other than the tape.

* * * * *